United States Patent [19]

Ritter

[11] Patent Number: 4,606,902
[45] Date of Patent: Aug. 19, 1986

[54] PROCESS FOR PREPARING REFRACTORY BORIDES AND CARBIDES

[75] Inventor: Joseph J. Ritter, Mt. Airy, Md.

[73] Assignee: The United States of America as represented by the Secretary of Commerce, Washington, D.C.

[21] Appl. No.: 783,503

[22] Filed: Oct. 3, 1985

[51] Int. Cl.$^4$ .................... C01B 31/36; C01B 35/04; C04B 35/52; C04B 35/58

[52] U.S. Cl. .................... 423/345; 423/289; 423/297; 423/439; 423/440; 501/88; 501/96

[58] Field of Search ............ 423/289, 291, 297, 439, 423/440, 345; 501/94, 96, 49, 51, 87, 88

[56] References Cited

U.S. PATENT DOCUMENTS 3,488,291  1/1970  Hardy et al. .................... 501/87
4,529,575  7/1985  Enomoto et al. .................... 501/88

FOREIGN PATENT DOCUMENTS 139100   11/1975  Japan .................... 423/440
140400   11/1975  Japan .................... 423/440
1134782  11/1968  United Kingdom .................... 423/346

Primary Examiner—John Doll
Assistant Examiner—Robert M. Kunemand
Attorney, Agent, or Firm—Eugene J. Pawlikowski; Alvin J. Englert; Albert Tockman

[57] ABSTRACT

Refractory borides or carbides are prepared by contacting an alkali-metal reducible metal chloride or silicon tetrachloride with boron trichloride or carbon tetrachloride in an inert solvent in the presence of an alkali metal, the metal chloride or silicon tetrachloride and the boron trichloride or carbon tetrachloride being present in an amount about stoichiometrically equivalent to the boride or carbide to be prepared and the alkali metal being present in an amount about stoichiometrically equivalent to the amount of chloride in the metal chloride or silicon tetrachloride and the boron trichloride or carbon tetrachloride, until all chloride present has reacted with the alkali metal to form alkali metal chloride, separating the inert solvent to leave a solid residue containing a metal boride, silicon carbide or metal carbide precursor together with the alkali metal chloride, and calcining the residue while separating the alkali metal chloride until the precursor is converted to the refractory boride or carbide.

17 Claims, No Drawings

PROCESS FOR PREPARING REFRACTORY BORIDES AND CARBIDES

BACKGROUND OF THE INVENTION

1. Field of the Invention

This invention relates to a process for preparing refractory borides and carbides. The process is operative at temperatures considerably lower than those in general use for the preparation of such refractory materials.

As is well known, certain borides and carbides are highly refractory and are useful in the fabrication of products capable of withstanding high temperatures and physical and chemical attack. Titanium diboride ($TiB_2$), for example, is useful in the fabrication of bushing materials, bearing liners, nozzles and wear plates. Its electrical conductivity makes it useful as a cathode material in the electrolytic reduction of aluminum ore. Silicon carbide (SiC), for example, exhibits high thermal conductivity and low thermal expansion, making it particularly resistant to thermal shock. It is extensively used in a wide variety of applications.

2. Discussion of the Prior Art

As described in U.S. Pat. No. 3,004,830, borides are generally manufactured by heating an oxide of the metal whose boride is to be prepared and boric oxide or boric acid together with a carbon source at a high temperature in an electric arc furnace. U.S. Pat. No. 4,405,021 describes the preparation of titanium diboride by the heterogeneous reaction of gaseous boron trichloride with titanium trichloride or titanium dichloride at 600°–750° C. and 600°–1100°C., respectively.

Carbides are generally manufactured by heating silicon dioxide or the metal whose carbide is to be prepared, usually as its oxide or chloride, with a carbon source, such as coke or anthracite coal, at temperatures usually not less than 1400° C., and generally approaching 2000° C. or even higher.

SUMMARY OF THE INVENTION

The present invention provides a method for the preparation of a refractory boride or carbide which comprises contacting a metal chloride, said metal chloride undergoing reduction on reaction with an alkali metal, or silicon tetrachloride with boron trichloride or carbon tetrachloride in an inert solvent and in the presence of an alkali metal, said metal chloride or silicon tetrachloride and said boron trichloride or carbon tetrachloride being present in an amount about stoichiometrically equivalent to the boride or carbide to be prepared, and said alkali metal being present in an amount about stoichiometrically equivalent to the amount of chloride in said metal chloride or silicon tetrachloride and said boron trichloride or carbon tetrachloride, until the aforesaid chlorides present have reacted with the alkali metal to form alkali metal chloride, separating the inert solvent to leave a solid residue containing a metal boride, silicon carbide or metal carbide precursor together with the alkali metal chloride, and heating said residue at about 700°–900° C., while separating the alkali metal chloride, until the said precursor is converted to the refractory boride or carbide.

DETAILED DESCRIPTION OF THE INVENTION

The process of the present invention is applicable with all metal chlorides which undergo reduction with alkali metals such as sodium, lithium or potassium. It is particularly useful in the preparation of borides of transition metals, particularly titanium, zirconium, chromium, manganese, molybdenum, tungsten, niobium and tantalum. It is also useful in the preparation of silicon carbide and heavy metal carbides, such as those of Groups IVB, VB and VIB metals, and more particularly tungsten, titanium, tantalum, niobium, chromium, molybdenum, vanadium, hafnium and zirconium.

The metal chloride or silicon tetrachloride to be converted to the boride or carbide is mixed with an approximately stoichiometrically equivalent amount of boron trichloride or carbon tetrachloride. By stoichiometrically equivalent amount is meant that the reactants are present in an amount equivalent to the boride or carbide to be formed.

The reactants and the alkali metal, such as lithium, potassium or sodium, are reacted with each other in the presence of an inert solvent. By inert solvent is meant a solvent unreactive with any of the aforesaid chloride reactants or with the alkali metal. A list of solvents particularly useful in the process of the present invention would include aliphatic hydrocarbons, such as heptane, or commercial solvent mixtures of aliphatic hydrocarbons boiling in the range 50°–100° C., aromatic hydrocarbons such as benzene and toluene, ethers such as diisopropyl ether, methoxybenzene and tetrohydrofuran. Volatile solvents, such as heptane, are preferred because they can be readily purified and dried (since alkali metal is present, the solvent must be dry!) and can be conveniently separated by evaporation after the first stage of the process has been completed.

One skilled in the art would have no difficulty in determining the molar ratios and calculating the weights of the reactants utilized to form the desired boride or carbide, and the amount of alkali metal required to combine with the chlorine present in the reactants. For example, the overall reaction for the preparation of titanium diboride precursor can be written as follows:

$$TiCl_4 + 2BCl_3 + 10Na \rightarrow TiB_2 + 10NaCl$$

and for SiC precursor as follows:

$$SiCl_4 + CCl_4 + 8Na \rightarrow SiC + 8NaCl$$

It is noted that alkali metals, silicon tetrachloride and most of the metal chlorides utilized as reactants in the process of the present invention are unstable in the presence of water or react with moisture normally present in ambient air. Accordingly, the process of the present invention, both for safety reasons and to achieve a pure product, is best effected using carefully dried solvents and equipment protected by means of drying tubes or the like from contact with moisture. Preferably, the reaction is effected in an inert environment, such as in an atmosphere of nitrogen, argon, helium or other inert gas.

Depending on the amount of reactants present and the efficiency of stirring, the first stage of the reaction will usually be complete within several days or a week. The rate of reaction can be enhanced by warming the reaction mixture and/or by agitating it using ultrasonic waves or a cowles-type homogenizer blade. The reaction is considered complete when samples of the vapor phase, in contact with the reaction mixture, no longer contain detectable amounts of the chloride reactants.

The solvent is then separated, most conveniently, by distillation or evaporation under vacuum.

The residue remaining after the solvent has been removed is transferred to a boat or crucible or other heat-resistant vessel suitable for use in the subsequent heating step. The vessel should be fabricated of a material non-reactive with the boride or carbide precursor, and the boride or carbide to be formed, at the temperatures encountered in the heating step. Preferably, the vessel should be made of a high-melting precious metal, such as gold or platinum, or a highly inert ceramic. Transfer of the residue from the first stage to the vessel should be in an atmosphere free of moisture, such as in a dry-box, and preferably in an inert environment.

The residue contained in the vessel is then heated under vacuum to remove the alkali metal halide present, most usually sodium chloride, and convert the boride or carbide precursor to the corresponding boride or carbide. In heating the residue, the temperature is gradually raised to about 400°-500° C., at which temperature range what appears to be a highly exothermic transition reaction occurs. After the exothermic reaction subsides, the temperature is raised to about 700°-900° C., preferably 800° C., and heating is continued for about a day until conversion of the precursor to the boride or carbide is complete. During this heat treatment step, which is under vacuum, the alkali metal chloride originally present in the residue sublimes and is separated from the residue.

Without limiting the invention to any particular theoretical mode or mechanism, it is believed that the alkali metal abstracts chlorine from the reactants to form fragments, which then combine with each other. For example,

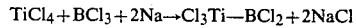

$$TiCl_4 + BCl_3 + 2Na \rightarrow Cl_3Ti-BCl_2 + 2NaCl$$

Each chlorine metal bond on such intermediate is a potential site for further chlorine abstraction and coupling. Eventually, a three-dimensional Bi-Ti matrix is achieved. That matrix is a precursor to titanium diboride and is converted to crystalline titanium diboride by heating.

My invention is further illustrated by means of the following non-limiting examples.

EXAMPLE 1

This example illustrates the preparation of titanium diboride. All manipulations described were conducted using high vacuum techniques and/or in an inert atmosphere.

The reactor, equipped with a magnetic stirring bar, was charged with 100 millimoles of metallic sodium dispersed as micron-sized particles in toluene, together with about 20 ml of sodium-dried heptane. The slurry of sodium in toluene/heptane was degassed by several freeze-evacuate-thaw cycles. A dropping funned was charged with 20 ml of sodium-dried n-heptane and the solvent degassed by several freeze-evacuate-thaw cycles. Twenty millimoles of boron trichloride and 10 millimoles of titanium tetrachloride were distilled into the dropping funnel and dissolved in the heptane. Then, the heptane solution, containing boron trichloride and titanium tetrachloride, was added drop-wise to the stirred suspension of sodium in toluene/heptane in the reactor over a period of about 1 hour at room temperature (about 25° C.). When addition was complete, stirring was continued and the progress of the reaction monitored by periodically sampling the gaseous phase over the liquid reaction mixture and analyzing it by infrared spectroscopy. After about 5 days, boron trichloride and titanium tetrachloride were no longer detectable in the gas phase and the reaction was considered complete. The volatile materials were distilled off under vacuum and about 7 grams of fluffy black powder remained in the reactor.

A 1 gram sample of the above powder was transferred under argon to a gold boat and heated under vacuum in a fused silica tube. At about 400°-500° C. there occurred a highly exothermic reaction, and some of the solid was lost from the boat. The temperature was raised and heating was continued at 900° C. for 18 hours, during which time sodium chloride sublimed to the cooler portions of the silica tube. X-ray diffraction patterns of the residue in the boat confirmed that the product was predominantly $TiB_2$. The product was salt-free, but contained a small amount of TiB.

EXAMPLE 2

Using a similar procedure 10 millimols of $SiCl_4$, 10 millimols of $CCl_4$, and 80 millimols of Na were reacted to form silicon carbide. As in Example 1, a highly exothermic reaction occurred at about 400°-500° C.

EXAMPLE 3

Using a similar procedure, 10 millimols of $TiCl_4$, 10 millimols of $CCl_4$ and 80 millimols of Na were reacted to form titanium carbide. As in Examples 2 and 3, a highly exothermic reaction occurred at about 400°-500° C.

The method of the present invention is also useful in the preparation of composite materials, such as $TiB_2/SiC$, $B_4C/TiB_2$ and $TiB_2/TiC$. It provides a means of preparing materials at relatively low temperatures, including materials which cannot be prepared by conventional procedures, even at substantially higher temperatures.

I claim:

1. A method for the preparation of a refractory boride or carbide which comprises contacting a metal chloride, said metal chloride undergoing reduction on reaction with an alkali metal, or silicon tetrachloride with boron trichloride or carbon tetrachloride in a solvent unreactive with said alkali metal and said chlorides in the presence of an alkali metal, said metal chloride or silicon tetrachloride and said boron trichloride or carbon tetrachloride being present in an amount about stoichiometrically equivalent to the boride or carbide to be prepared and said alkali metal being present in an amount about stoichiometrically equivalent to the amount of chloride in said metal chloride or silicon tetrachloride and said boron trichloride or carbon tetrachloride, until the aforesaid chlorides present have reacted with the alkali metal to form alkali metal chloride, separating the solvent to leave a solid residue containing a metal boride, silicon carbide or metal carbide precursor together with the alkali metal chloride, and heating the residue at about 700°-900° C. while separating the alkali metal chloride until the said precursor is converted to the refractory boride or carbide.

2. A method for the preparation of a refractory boride which comprises contacting a metal chloride, said metal chloride undergoing reduction on reaction with an alkali metal, with boron trichloride in a solvent unreactive with said alkali metal and said chlorides in the presence of an alkali metal, the metal chloride and the boron trichloride being present in an amount about stoichiometrically equivalent to the boride to be prepared and said alkali metal being present in an amount about stoichiometrically equivalent to the amount of chloride in the metal chloride and the boron trichloride, until the aforesaid chlorides have reacted with the alkali metal to form alkali metal chloride, separating the solvent to leave a solid residue containing a metal boride precursor together with the alkali metal chloride, and heating the residue at about 600°–800° C. while separating the alkali metal chloride until the said precursor is converted to the refractory boride.

3. A method according to claim 2, wherein the alkali metal is sodium.

4. A method according to claim 2, wherein the metal chloride is a transition metal chloride.

5. A method according to claim 4, wherein the metal chloride is titanium tetrachloride.

6. A method according to claim 2, wherein the solvent is an aliphatic hydrocarbon, an aromatic hydrocarbon or an ether.

7. A method according to claim 6, wherein the solvent is heptane.

8. A method according to claim 2, wherein heating is at 800° C.

9. A method according to claim 2, wherein the reaction is effected in an inert atmosphere.

10. A method for the preparation of a refractory carbide which comprises contacting silicon tetrachloride or a metal chloride, said metal chloride undergoing reduction on reaction with an alkali metal, with carbon tetrachloride in a solvent unreactive with said alkali metal and said chlorides in the presence of an alkali metal, silicon tetrachloride or said metal chloride and said carbon tetrachloride being present in an amount about stoichiometrically equivalent to the carbide to be prepared and said alkali metal being present in an amount about stoichiometrically equivalent to the amount of chloride in said silicon tetrachloride or said metal chloride and said carbon tetrachloride, until the aforesaid chlorides have reacted with the alkali metal to form alkali metal chloride, separating the solvent to leave a solid residue containing silicon carbide or metal carbide precursor together with the alkali metal chloride, and heating the residue at about 700°–900° C. while separating the alkali metal chloride until the said precursor is converted to the refractory carbide.

11. A method according to claim 10, wherein the alkali metal is sodium.

12. A method according to claim 10, wherein the metal chloride is a Group IVB, VB or VIB chloride.

13. A method according to claim 10, wherein the solvent is an apliphatic hydrocarbon, an aromatic hydrocarbon or an ether.

14. A method according to claim 13, wherein the solvent is heptane.

15. A method according to claim 10, wherein heating is at 800° C.

16. A method according to claim 10, wherein the reaction is effected in an inert atmosphere.

17. A method according to claim 10, wherein the carbide is silicon carbide.

* * * * *